United States Patent
Sang et al.

(10) Patent No.: US 10,798,435 B2
(45) Date of Patent: Oct. 6, 2020

(54) DYNAMIC VISUAL EFFECT ENHANCING SYSTEM FOR DIGITAL CINEMA AND CONTROL METHOD THEREOF

(71) Applicant: GDC Technology (Shenzhen) Limited, Shenzhen (CN)

(72) Inventors: Huan Sang, Beijing (CN); Li Gu, Beijing (CN)

(73) Assignee: GDC TECHNOLOGY (SHENZHEN) LIMITED, Shenzhen (CN)

( * ) Notice: Subject to any disclaimer, the term of this patent is extended or adjusted under 35 U.S.C. 154(b) by 112 days.

(21) Appl. No.: 15/686,150

(22) Filed: Aug. 24, 2017

(65) Prior Publication Data

US 2018/0199083 A1 Jul. 12, 2018

(30) Foreign Application Priority Data

Nov. 22, 2016 (CN) .......................... 2016 1 1028786

(51) Int. Cl.
*H04N 5/76* (2006.01)
*H04N 21/242* (2011.01)
*H04R 3/00* (2006.01)
*G06F 3/16* (2006.01)
*H04N 21/81* (2011.01)
(Continued)

(52) U.S. Cl.
CPC .......... *H04N 21/242* (2013.01); *G06F 3/165* (2013.01); *H04N 21/235* (2013.01); *H04N 21/4131* (2013.01); *H04N 21/4307* (2013.01); *H04N 21/8106* (2013.01); *H04N 21/8186* (2013.01); *H04R 3/00* (2013.01); *H05B 45/20* (2020.01); *H05B 47/155* (2020.01);
(Continued)

(58) Field of Classification Search
CPC .............. H04N 21/242; H04N 21/235; H04N 21/4131; H04N 21/4307; H04N 21/8106; H04N 21/8186; G06F 3/165; H04R 3/00; H05B 33/0857; H05B 37/0245; H05B 37/0272; H05B 37/029
USPC .......................................... 386/311, 238–239
See application file for complete search history.

(56) References Cited

U.S. PATENT DOCUMENTS 6,384,893 B1 * 5/2002 Mercs ..................... A63J 25/00
                                                          352/123
8,281,344 B1 * 10/2012 Mathias ........... H04N 21/41415
                                                          709/203
(Continued)

*Primary Examiner* — Helen Shibru
(74) *Attorney, Agent, or Firm* — Morrison & Foerster, LLP

(57) ABSTRACT

Disclosed is a dynamic visual effect enhancing system for a digital cinema which may comprise: a sound effect control module for controlling a speaker for producing sound effects according to a digital movie, an illumination light control module for performing illumination of an auditorium before and after the digital movie is played, a light source control module for dynamically controlling a light group according to the digital movie, and a server for storing the digital movie and for controlling the light source control module and the sound effect control module according to the digital movie, wherein the server is configured for controlling the light source control module, the sound effect control module, and the illumination light control module via a communication network. A corresponding control method can cooperate with a surround sound effect and can precisely exhibit corresponding visual effects in a particular scene of a movie.

14 Claims, 2 Drawing Sheets

(51) Int. Cl.
*H04N 21/235* (2011.01)
*H04N 21/41* (2011.01)
*H04N 21/43* (2011.01)
*H05B 45/20* (2020.01)
*H05B 47/19* (2020.01)
*H05B 47/155* (2020.01)
*H05B 47/175* (2020.01)

(52) U.S. Cl.
CPC ........... H05B 47/175 (2020.01); H05B 47/19 (2020.01); *H04R 2227/003* (2013.01); *H04R 2420/07* (2013.01)

(56) References Cited

U.S. PATENT DOCUMENTS

| | | | | |
|---|---|---|---|---|
| 8,461,443 B2* | 6/2013 | McKinney | ............. | H05B 47/12 84/612 |
| 9,964,982 B1* | 5/2018 | Nguyen | ............. | G05F 1/66 |
| 2005/0076372 A1* | 4/2005 | Moore | ............. | A63J 25/00 725/78 |
| 2006/0020690 A1* | 1/2006 | Richards | ............. | H04L 12/2803 709/221 |
| 2009/0105856 A1* | 4/2009 | Kurt | ............. | H04B 47/18 700/90 |
| 2009/0292378 A1* | 11/2009 | Craig | ............. | G10H 1/46 700/94 |
| 2011/0190911 A1* | 8/2011 | Iwanami | ............. | H04N 21/8133 700/90 |
| 2015/0326911 A1* | 11/2015 | Burridge | ............. | H04N 21/42203 386/202 |
| 2015/0350628 A1* | 12/2015 | Sanders | ............. | H04N 5/2224 345/419 |
| 2017/0048476 A1* | 2/2017 | Freiin von Kapri | ............. | H04N 5/4403 |

* cited by examiner

DYNAMIC VISUAL EFFECT ENHANCING SYSTEM FOR DIGITAL CINEMA AND CONTROL METHOD THEREOF

FIELD

This disclosure relates generally to the field of digital cinema technology, and more particularly to a dynamic visual effect enhancing system for a digital cinema and a control method thereof.

BACKGROUND

With the development of film digitization such as filming/post-production/release and the like, traditional film technology has been gradually replaced by digital film technology. Currently, a cinema generally uses a motorized curtain device as a switch, and opens or closes a curtain by manually operating the switch during the playing of a movie. Moreover, generally, existing auditorium lights (also referred to as "house lights" within the cinema industry) are turned on when the audience enters, and gradually go dark when a movie is about to start, and are gradually turned on when the movie is about to end, and turn on fully when the movie ends.

Existing 3D or 4D movies, when played, are often accompanied by sound effects. However, when such a 3D or 4D movie is played, a user can neither implement real-time control of auditorium lighting according to the movie's content nor implement real-time dynamic synchronization of the movie's screen, sound elements, and auditorium lighting during playing of the movie.

SUMMARY

In view of drawbacks of prior cinema technology, an object of the present disclosure is to provide a dynamic visual effect enhancing system for a digital cinema and a control method thereof, which can overcome drawbacks in prior cinema technology. For example, when a 3D or 4D movie is played, a user can neither implement real-time control of auditorium lighting according to the movie's content nor implement real-time dynamic synchronization of the movie's screen, sound elements and auditorium lighting during playing of the movie.

The present disclosure may include the following technical solutions.

A dynamic visual effect enhancing system for a digital cinema, wherein the system comprises: a sound effect control module for controlling a speaker for playing sound effects from a digital movie (e.g., from the digital movie's soundtrack), an illumination light control module for performing illumination of an auditorium before and after the digital movie is played, a light source control module for dynamically controlling a light group according to the digital movie (e.g., the digital movie's soundtrack), and a server for storing the digital movie and for controlling the light source control module according to the digital movie (e.g., the digital movie's soundtrack). The server can control the light source control module, the sound effect control module, and the illumination light control module via a wired network or wireless network. The wireless network may be Bluetooth, Wi-Fi, or NFC.

The server in the dynamic visual effect enhancing system for a digital cinema can have two (2) functions: 1) providing a storage module to store digital content of a digital movie; and 2) providing a programming module to process images and sounds from the digital content. The server's programming module can synchronize such images and sounds with lighting systems via the light source control module.

The light source control module in the dynamic visual effect enhancing system for a digital cinema may consist of three (3) components: 1) a lighting control relay for generating, based on the programming module executing a program in the server, a lighting control signal; 2) a centralized power source controller for receiving the lighting control signal from the lighting control relay and for sending the lighting control signal to a light group; and 3) the light group for displaying different dynamic visual effects based on the lighting control signal. The lighting control relay can connect to the power source centralized controller, which can connect to the light group.

In the dynamic visual effect enhancing system for a digital cinema, the light group may have a plurality of lamps, to each of which said centralized power source controller may connect. Multiple LED lamps in the light group may connect with one centralized power source controller.

The light group in the dynamic visual effect enhancing system for a digital cinema may include LED lamps, LED strips, or existing auditorium lighting. The LED strips may be arranged around a speaker.

A control method of the dynamic visual effect enhancing system for a digital cinema may comprise the following steps.

(A) When a digital movie is in "play mode," the server's programming module can execute a program stored in the server's storage module and, based on execution of the program, generate a lighting control signal. The server's programming module can execute a program stored in the server's storage module and, based on execution of the program, generate a sound control signal.

(B) The sound effect control module can control a speaker according to the sound control signal, and the light source control module can control a light group according to the lighting control signal.

(C) This unique control of sound and light can produce dynamic visual effects.

The control method of the dynamic visual effect enhancing system for a digital cinema may further comprise the following step.

The server may ingest a file containing the digital movie, and then a one or more programs for the light source control module and for the sound effect control module may be created according to the information contained in the digital movie file. Then, the server may store the one or more programs for the light source control module and the sound effect control module program within the server.

The present disclosure provides a dynamic visual effect enhancing system for a digital cinema and a control method. The dynamic visual effect enhancing system can provide the ability to control intelligent programmable light sources that can synchronize with surround sound effects. This synchronization can produce a unique immersive experience during a movie through the complementary integration of visual content, visual effects, and sound elements. The dynamic visual effect enhancing system may also provide a unique immersive experience for trailers, pre-show content, or advertisements.

DETAILED DESCRIPTION

In order to make the object, technical solutions, and effects of the present disclosure clearer and more explicit, a further detailed description is made below. It should be noted that the specific embodiments described herein are merely illustrative and are not intended to limit the present disclosure.

Figure 1:
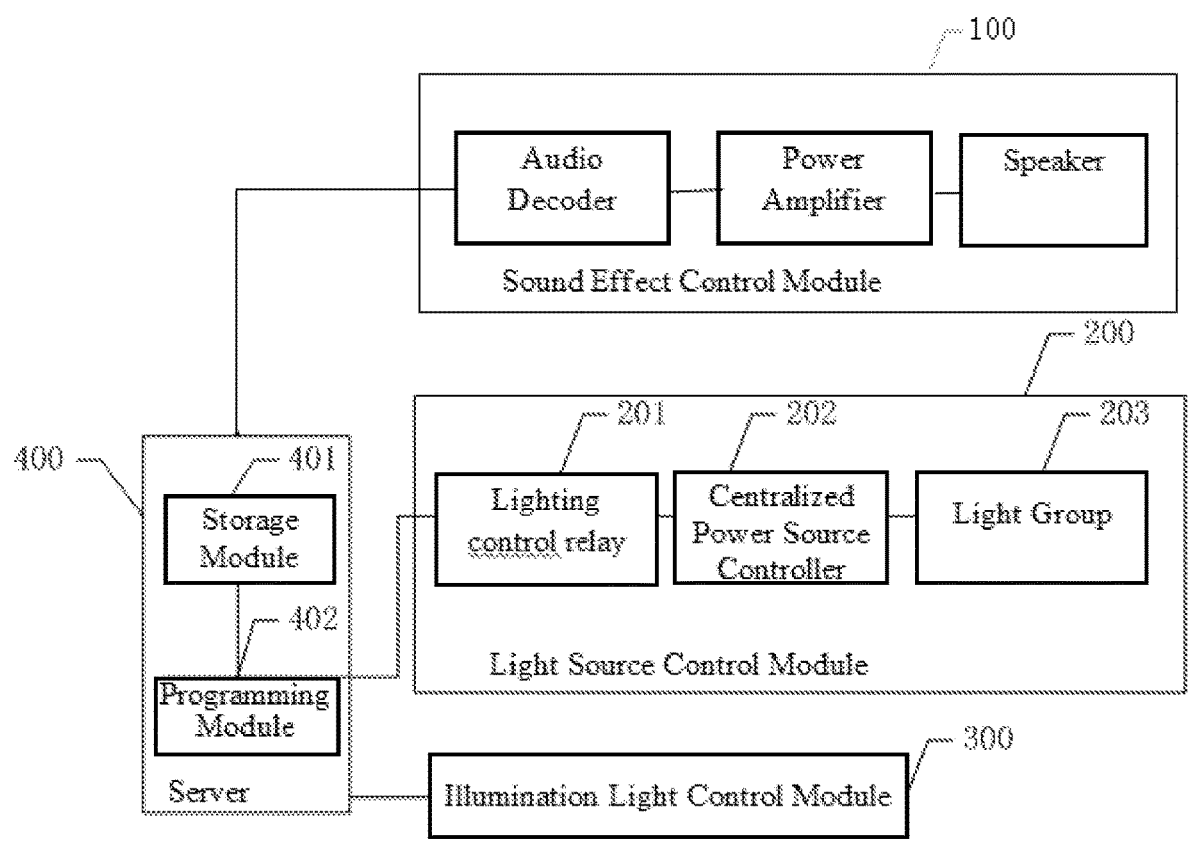
FIG. 1 is a schematic functional block diagram of a preferred embodiment of a dynamic visual effect enhancing system for a digital cinema according to the present disclosure.

The present disclosure provides a schematic functional block diagram of a preferred embodiment of a dynamic visual effect enhancing system for a digital cinema, as shown in FIG. 1, wherein the system comprises: a sound effect control module 100 to control a speaker producing a sound effect according to a digital movie, an illumination light control module 300 for performing auditorium illumination before and after a digital movie is played, a light source control module 200 for dynamically controlling on and off an auditorium light group according to a digital movie, and a server 400 for storing a digital movie and providing a programming control module to control the light source control module 200 according to the digital movie.

The server 400 is configured to control the light source control module 200, the sound effect control module 100, and the illumination light control module 300 via a communication network. The light source control module 200 may contain a network interface, relays (power receivers), a circuit breaker, power modules, wires, terminal blocks, and LED lights. The sound effect control module 100 may contain audio decoders, a power amplifier, and a speaker. The illumination light control module 300 may contain a network interface, and relays (power receivers). The storage module 401 and programming module 402 may be integrated into the digital cinema server 400.

Typically, in a particular plot or scene of a movie, a surround sound effect complements the narrative of the movie to create a more vivid experience for the audience. With the dynamic visual effect enhancing system, the audience can experience real-time dynamic synchronization of the movie's screen, sound elements, and auditorium lighting. This experience can provide the audience a deeper sense of immersion during the movie, and the enhanced auditorium can provide a more competitive and more distinctive viewing environment.

This dynamic visual effect enhancing system can work perfectly with a cinema server. In a movie using the dynamic visual effect enhancing system, the maximum latency in the cooperation of sound, screen, and lighting can be 100 milliseconds. The dynamic visual effect system can provide visual cues (i.e., light syncs) to complement sound elements. For example, a large explosion in a movie can occur simultaneously with a short flash of auditorium lights and a burst of sound elements, all within a time window of 100 milliseconds.

The server 400 may comprise a storage module 401 for storing a digital movie, and a programming module 402 for ingesting video frames and audio sounds of a digital movie for programmed control of the light source control module 200 and the sound effect control module 100. The storage module 401 and programming module 402 may be integrated into the digital cinema server 400. The storage module 401 can include a memory, such as a hard drive or a series of hard drives. The memory can also be other kinds of storage, as well. The programming module 401 may include a motherboard, a system disk, a CPU, and a memory. Alternatively, the programming module 401 may include an integrated media block.

In a further embodiment, the light source control module 200 comprises a lighting control relay 201 for generating, based on the programming module 402 executing a program in the server 400, a lighting control signal; a centralized power source controller 202 for receiving the lighting control signal sent from the lighting control relay 201 and for controlling the light group 203 based on the lighting control signal; and the light group 203 which can display different dynamic visual effects in the auditorium, separate from visual content on the movie screen. The light group 203 can be attached to or integrated into the auditorium's surround sound speakers. The light group 203 can emit light according to sound elements from the movie.

The centralized power source controller 202 can be connected to both the lighting control relay 201 and the light group 203. The light source control module 200 teachings of this dynamic visual effect enhancing system can be perfectly compatible with the cinema's existing lighting equipment, which may include: (a) a masking motor (e.g., motor that opens and closes theater screen curtains); (b) ambient lighting (i.e., "house lights"—lighted walkways, wall lights, etc.); and (c) all relevant control switches and connections. Additionally, the sound effect control module 100 teachings of this dynamic visual effect enhancing system can be perfectly compatible with the cinema's existing sound equipment, which may include: (a) an audio decoder(s); (b) a power amplifier; (c) a speaker; and all relevant audio interconnections. Without the necessity of configuring too many devices, the dynamic visual effect enhancing system can provide dynamic synchronization of a movie's screen, sound elements, and auditorium lighting by making appropriate adjustments in the cinema's existing equipment, thereby reducing the upgrading costs of the cinema's auditorium. In some embodiments, the dynamic visual effect enhancing system can lights and lighting modules integrated onto existing auditorium speakers.

The light group 203 can have a plurality of lamps, to each of which the centralized power source controller 202 can be connected, thereby realizing discrete control of each path of lamps and achieving a parallel-connecting effect. The theatrical industry has not adopted technology for discrete control and for producing a parallel-connecting effect. Additionally, the connection under the dynamic visual effect enhancing system transmits direct current power. Previous technology uses an alternating current, which causes interference to a speaker's signal. The direct current avoids such interference. The lamps can be LED lamps and/or LED strips arranged around a speaker. As an overall upgrading of the auditorium can include such newly-added light source strips, the dynamic visual effect enhancing system can simultaneously control the newly-added light source strips and the existing lighting of the auditorium, thereby realizing a high unity of sound, screen, and lighting and giving the audience a comprehensive sense of immersion, wherein the color of the LED lamps and/or LED strips can also be adjusted according to a digital movie. Moreover, the LED lamps and/or LED strips are generally more energy efficient than other kinds of lighting elements.

The server 400 can control the light source control module 200 and the sound effect control module 100 via a wired network or a wireless network. The wireless network can be Bluetooth, Wi-Fi, or NFC. The user can select an operating manner of the server as needed. In a wireless network, the Bluetooth network can be used for short-range communication, and the Wi-Fi can be used for long-range communication, to perform connection and control.

Figure 2:
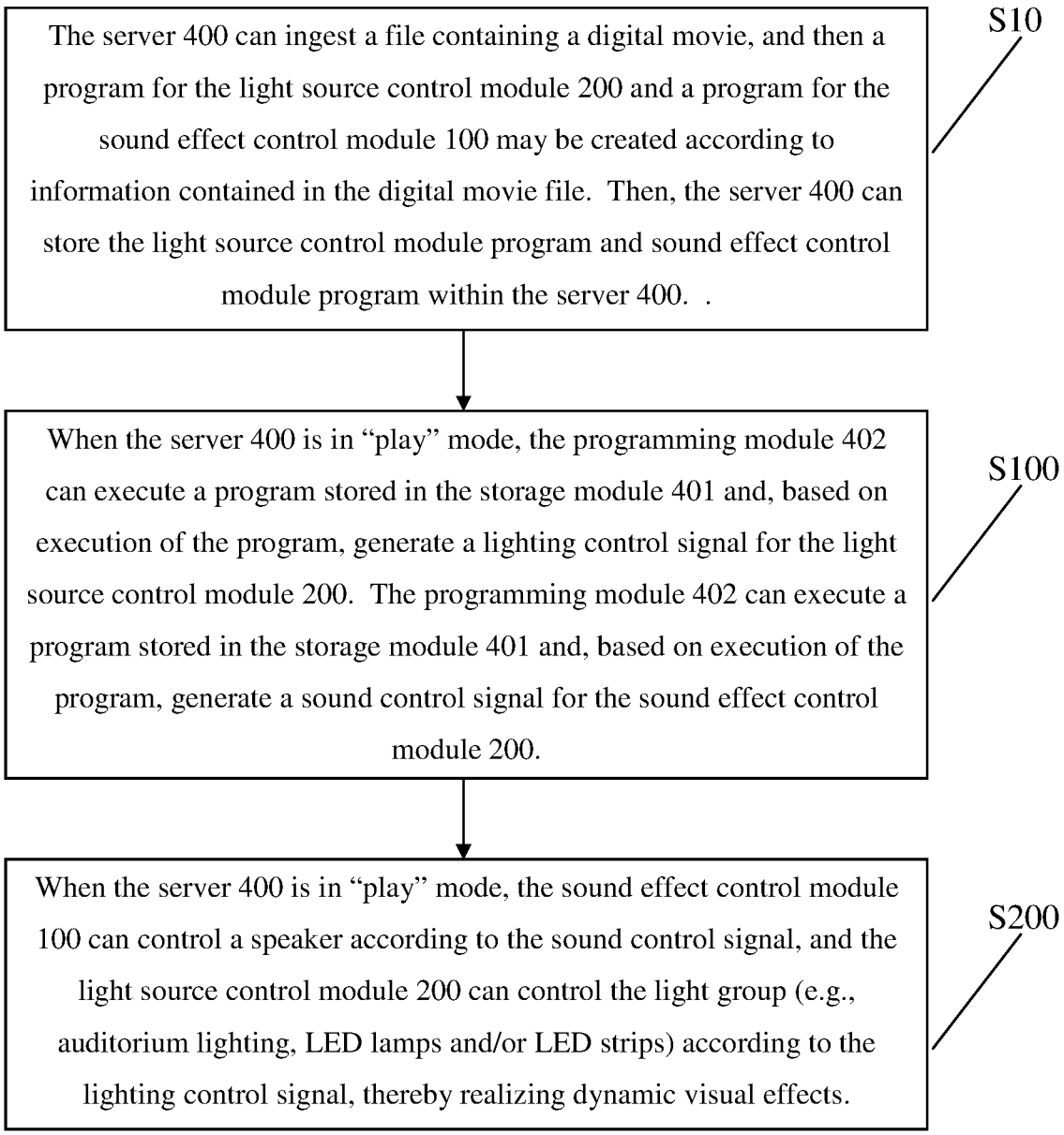
FIG. 2 is a flowchart of a preferred embodiment of a control method of the dynamic visual effect enhancing system for a digital cinema according to the present disclosure.

The present disclosure further provides a flowchart of a preferred embodiment of a control method of the dynamic visual effect enhancing system for a digital cinema, as shown in FIG. 2, wherein the method comprises steps S100 and S200.

In step S100, the server 400 can be in "play" mode when a digital movie is played. In the server 400, the programming module 402 can execute a program stored in the storage module 401 and, based on execution of the program, generate a lighting control signal for the light source control module 200. The programming module 402 can execute a program stored in the storage module 401 and, based on execution of the program, generate a sound control signal for the sound effect control module 200. The server may have three states: stop, play, or pause.

In step S200, the sound effect control module 100 can control a speaker according to the sound control signal, and the light source control module 200 can control the light group (e.g., auditorium lighting, LED lamps and/or LED strips) according to the lighting control signal, thereby realizing dynamic visual effects. Examples of dynamic visual effects may include: emphasizing sound track elements via light synchronization (e.g., emphasizing an explosion on screen during a movie via concurrently flashing auditorium lights) and providing visual cues to match sound elements (e.g., warm color lighting for joyful scenes (e.g., festival) and cold color lighting for darker scenes (e.g., winter)). In controlling the speaker, the sound effect control module 100 can also play audio signals from the server 400 through the speaker.

The sound effect control module 100 and the light source control module 200 can respectively control sound and lighting based on the server 400 executing a program stored in the server 400. Relying on a series of intelligent programmable LED light sources, when a feature, trailer, pre-show, or advertisement of a movie is playing, the control method can cooperate with a surround sound effect and can precisely exhibit corresponding visual effects for a particular scene of the movie, which can give the audience a unique and immersive experience.

In a further embodiment, prior to step S100, the method can further comprise a step S10. In step S10, the server 400 can ingest a file containing a digital movie, and then a program for the light source control module 200 and a program for the sound effect control module 100 may be created according to information contained in the digital movie file. Then, the server 400 can store the light source control module program and sound effect control module program within the server 400.

In a specific implementation, a specific program can be written into a cinema server, and then can be used with an automatic lighting control system (e.g., ACS-2800 developed by GDC independently). Afterwards, the unity of sound, screen, and lighting effect can be realized through multiple lighting systems, each supported by an independent power source. An example lighting system can comprise a speaker and a light, which may be an LED strip or an integrated light bulb. Another example lighting system can comprise standalone lights (e.g., walkway lights, ceiling lights, etc.). The number of lighting systems can be on a case by case basis according to the existing auditorium. The centralized power source controller 202 can be an independent power source providing power to multiple lighting systems, which can correspond to multiple LED lamps.

In summary, the present disclosure provides a dynamic visual effect enhancing system for a digital cinema and a control method thereof. The system may comprises: a sound effect control module for controlling a speaker for producing sound effects according to a digital movie; an illumination light control module for performing illumination of an auditorium before and after the digital movie is played; a light source control module for dynamically controlling a light group according to the digital movie; and a server for storing a digital movie and for controlling the light source control module and the sound effect control module according to the digital movie; wherein the server is configured for controlling the light source control module, the sound effect control module, and the illumination light control module via a communication network. With intelligent programmable light sources, when a feature, trailer, pre-show, or advertisement of a movie is playing, the control method can cooperate with a surround sound effect and can precisely exhibit corresponding visual effects for a particular scene of the movie. The dynamic visual effect enhancing system and the control method can produce a unity of sound, screen, and lighting effects through multiple lighting systems, each supported by an independent power source.

It should be noted that the application of the present disclosure is not limited to the above-described examples. Those of ordinary skill in the art may perform modification or variation in accordance with the foregoing description, and all such modifications and variations should fall into the scope of the appended claims of the present disclosure.

What is claimed is:

1. A dynamic visual effect enhancing system for a digital cinema to be presented in a movie theater, the system comprising:
    a sound effect control unit configured to control a speaker for producing a sound effect according to the digital movie;
    a visual effect light source control unit configured to control a light group for visual effects in a theater, said light source control including;
    a lighting control for generating a visual effect lighting control signal that complements the content of the digital movie, and
    a power source controller configured to receive the lighting control signal from the lighting control and to control the light group by generating power signals to cause the display of different visual effects;
    a programming module for creating an executable program to provide sound effects and visual effects, wherein the executable program is created according to one of an image file and a sound file contained in the digital movie; and
    a server configured to control the visual effect light source control unit and the sound effect control unit, wherein the visual effect light source control unit and the sound effect control unit are controlled in accordance with the executable program created by the programming module,
    wherein the server includes a storage for storing the image file and the sound file of the digital movie, and
    wherein the server is configured to control the light source control unit and the sound effect control unit via a communication network.

2. The dynamic visual effect enhancing system for a digital cinema according to claim 1,
    a centralized power source controller for receiving the lighting control signal from the lighting control relay and for controlling the light group wherein the light group displays different dynamic visual effects based on different lighting control signal, and wherein the power source controller is directly connected to the lighting control and the light group.

3. The dynamic visual effect enhancing system for a digital cinema according to claim 2, wherein the light group has a plurality of lamps, each lamp connected to the centralized power source controller.

4. The dynamic visual effect enhancing system for a digital cinema according to claim 3, wherein the lamps comprise LED lamps or LED strips.

5. The dynamic visual effect enhancing system for a digital cinema according to claim 1, wherein the server is configured for controlling the visual effect light source control unit and the sound effect control unit via a wireless network.

6. The dynamic visual effect enhancing system for a digital cinema according to claim 5, wherein the wireless network is one of Bluetooth, Wi-Fi, and NFC.

7. The dynamic visual effect enhancing system for a digital cinema according to claim 4, wherein the LED lamps or the LED strips are arranged around the speaker.

8. A dynamic visual effect enhancing system for a digital cinema to be presented in a movie theater, the system comprising:
- a sound effect control means for controlling a speaker to produce a sound effect according to the digital movie;
- a visual effect light source control means for controlling a light group for visual effects in a theater, said light source control means including;
- a lighting control for generating a visual effect lighting control signal that complements the contents of the digital movie, and
- a power source controller configured to receive the lighting control signal from the lighting control and to control the light group by generating power signals to cause the display of different visual effects;
- a programming module for creating an executable program to provide sound effects and visual effects, wherein the executable program is created according to one of an image file and a sound file contained in the digital movie: and

- a server configured to control the visual effect light source control means and the sound effect control means, wherein the visual effect light source control means and the sound effect control means are controlled in accordance with the executable program created by the programming module, wherein the server includes a storage for storing the image file and the sound file of the digital movie and wherein the server is configured to control the light source control unit and the sound effect control unit via a communication network.

9. The dynamic visual effect enhancing system for a digital cinema according to claim 8, wherein the light group displays different dynamic visual effects based on different lighting control signal, and wherein the power source controller is directly connected to the lighting control and the light group.

10. The dynamic visual effect enhancing system for a digital cinema according to claim 2, wherein the light group has a plurality of lamps, each lamp connected to the centralized power source controller.

11. The dynamic visual effect enhancing system for a digital cinema according to claim 3, wherein the lamps comprise LED lamps or LED strips.

12. The dynamic visual effect enhancing system for a digital cinema according to claim 1, wherein the server is configured for controlling the visual effect light source control unit and the sound effect control unit via a wireless network.

13. The dynamic visual effect enhancing system for a digital cinema according to claim 5, wherein the wireless network is one of Bluetooth, Wi-Fi, and NFC.

14. The dynamic visual effect enhancing system for a digital cinema according to claim 4, wherein the LED lamps or the LED strips are arranged around the speaker.

* * * * *